Patented Oct. 29, 1935

2,018,811

UNITED STATES PATENT OFFICE 2,018,811

COMPLEX METALLIC COMPOUND OF SATURATED ALIPHATIC HYDROXY CARBOXYLIC ACIDS CONTAINING THE METAL IN ITS HIGHER STATE OF VALENCY AND A PROCESS OF MAKING THE SAME

Hans Schmidt, Vohwinkel, near Elberfeld, Germany, assignor to Winthrop Chemical Company, Inc., New York, N. Y., a corporation of New York No Drawing. Application October 28, 1929, Serial No. 403,143. In Germany November 1, 1928

21 Claims. (Cl. 260—11)

The present invention relates to new complex metallic compounds of saturated aliphatic hydroxy carboxylic acids containing at least one hydroxy group standing in alpha-position to a carboxylic acid group and to a process of preparing the same.

In accordance with the present invention, new metallic complex compounds are prepared by reacting with a peroxide, such as hydrogen peroxide or magnesium peroxide, upon a complex heavy metal compound of a saturated aliphatic hydroxy carboxylic acid containing at least one hydroxy group standing in alpha-position to a carboxylic acid group, said heavy metal being capable of forming more than one stage of valency and being present in a lower stage of valency. By this oxidation process the complex bound heavy metal is transformed from its lower into its higher stage of valency. Such heavy metals are, for instance, antimony, tin, iron, cobalt, manganese, arsenic, chromium and vanadium. The starting materials suitable for the purpose of the invention are obtainable quite generally by heating an aqueous suspension of an oxide or hydroxide of a metal of the character described and an aliphatic hydroxy carboxylic acid or a salt thereof of the character described until a clear solution has been obtained and, if desired, neutralizing the reaction mixture and precipitating the complex compound formed by pouring the reaction mixture into an organic precipitant, such as alcohol, or by evaporating to a dry state. Some complex compounds crystallize from their aqueous solutions, such as, for instance, antimonyl potassium tartrate.

In carrying out my new process, the starting complex compound is dissolved in water. To the solution there is added at least the calculated amount of a peroxide, that is, the quantity of the oxidizing agent which is required for transforming the metal from the lower into the higher state of oxidation. Preferably, a small excess of the calculated amount is used. The reaction proceeds while self-heating and is complete after a short time. If the temperature increases too much, for instance, up to the boiling point, cooling of the mixture is advisable. Instead of using a substance yielding oxygen, free oxygen or gases containing oxygen may be employed.

After completion of the reaction, the solution is neutralized by the addition of an organic or inorganic base and evaporated to a dry state or precipitated by pouring the solution into an organic precipitant, such as alcohol or acetone.

The new compounds are generally water-soluble substances. They are white or colored, the color depending on the specific heavy metal used.

The invention is illustrated by the following examples, without being limited thereto:

*Example 1.*—20 grams of antimonyl potassium tartrate are dissolved by heating in 50 ccm. of water, and an excess of hydrogen peroxide solution is added. After standing for some time, the solution is neutralized with dilute caustic potash, filtered and the filtrate precipitated by pouring it into methyl alcohol. The complex salt produced is obtained in form of a white powder which is readily soluble in water. Antimony sulfide is precipitated from the acidified solution by hydrogen sulfide.

*Example 2.*—20 grams of potassium stannous tartrate, prepared by reacting upon acid potassium tartrate with stannous hydroxide and potassium hydroxide, are dissolved in water and an excess of hydrogen peroxide is added. The solution is neutralized with dilute caustic potash and evaporated to a dry state, preferably in vacuo. The complex salt of tetravalent tin is obtained as a whitish powder which dissolves in water on heating.

*Example 3.*—30 grams of sodium-trivalent antimony gluconate are dissolved in 50 ccm. of water and an excess of 30% hydrogen peroxide solution is added. The reaction mixture is cooled. When the reaction is complete, neutralization is effected by means of dilute caustic soda solution and the complex salt is precipitated by pouring the solution into methyl alcohol. After drying in a desiccator a whitish powder is obtained which dissolves readily in water.

*Example 4.*—30 grams of the diethylamino-trivalent antimony salt of mucic acid, prepared by reacting the acid diethylamine salt of mucic acid with antimony oxide and evaporating the filtered solution to crystallization, are dissolved in 50 ccm. of water and oxidized with an excess of 30% hydrogen peroxide solution while cooling. When the reaction is complete, neutralization is effected by means of dilute diethylamine solution. By evaporating the solution and drying in a desiccator, the complex salt is obtained as a whitish powder which dissolves readily in water.

In an analogous manner, the complex salts of other metals or metallic elements with tartaric acid or other aliphatic hydroxy carboxylic acids, such as lactic acid or citric acid, can be subjected to oxidation; other bases, such as, for example, nitrogenous bases, can likewise be used as salt forming agents.

I claim:

1. The process which comprises oxidizing in aqueous solution sodium trivalent antimony gluconate wherein the antimony replaces hydrogen atoms of alcoholic hydroxyl groups with hydrogen peroxide and neutralizing the solution by the addition of dilute caustic soda solution.

2. In the process of preparing metallic complex compounds, the step which comprises oxidizing in an aqueous solution one mol of a complex water-soluble salt of a saturated aliphatic hydroxy carboxylic acid containing at least one hydroxy group in alpha-position to a carboxylic group, in which hydroxy group the hydrogen atom is replaced by a heavy metal capable of forming more than one stage of valency and being in a lower stage of valency, with at least half a mol of a peroxide of the group consisting of hydrogen- and light metal peroxides for each valency to be added to the original valency of the heavy metal.

3. In the process of preparing metallic complex compounds, the step which comprises oxidizing in an aqueous solution one mol of a complex water-soluble salt of a saturated aliphatic hydroxy carboxylic acid containing at least one hydroxy group in alpha-position to a carboxylic group, in which hydroxy group the hydrogen atom is replaced by a heavy metal capable of forming more than one stage of valency and being in a lower stage of valency, with somewhat more than half a mol of a peroxide of the group consisting of hydrogen- and light metal peroxides for each valency to be added to the original valency of the heavy metal.

4. In the process of preparing metallic complex compounds, the step which comprises oxidizing in an aqueous solution one mol of a complex water-soluble salt of a saturated aliphatic hydroxy carboxylic acid containing 3 to 6 carbon atoms and containing at least one hydroxy group in alpha-position to a carboxylic group, in which hydroxy group the hydrogen atom is replaced by a heavy metal capable of forming more than one stage of valency and being in a lower stage of valency, with at least half a mol of a peroxide of the group consisting of hydrogen- and light metal peroxides for each valency to be added to the original valency of the heavy metal.

5. In the process of preparing metallic complex compounds, the step which comprises oxidizing in an aqueous solution one mol of a complex water-soluble salt of a saturated aliphatic hydroxy carboxylic acid containing 3 to 6 carbon atoms and containing at least one hydroxy group in alpha-position to a carboxylic group, in which hydroxy group the hydrogen atom is replaced by a heavy metal capable of forming more than one stage of valency and being in a lower stage of valency, with somewhat more than half a mol of a peroxide of the group consisting of hydrogen- and light metal peroxides for each valency to be added to the original valency of the heavy metal.

6. In the process of preparing metallic complex compounds, the step which comprises oxidizing in an aqueous solution one mol of a complex water-soluble salt of a saturated aliphatic hydroxy carboxylic acid containing at least one hydroxy group in alpha-position to a carboxylic group, in which hydroxy group the hydrogen atom is replaced by trivalent antimony with somewhat more than one mol of a peroxide of the group consisting of hydrogen- and light metal peroxides.

7. The process which comprises oxidizing in an aqueous solution one mol of a complex water-soluble salt of a saturated aliphatic hydroxy carboxylic acid containing at least one hydroxy group in alpha-position to a carboxylic group, in which hydroxy group the hydrogen atom is replaced by a heavy metal capable of forming more than one stage of valency and being in a lower stage of valency, with at least half a mol of a peroxide of the group consisting of hydrogen- and light metal peroxides for each valency to be added to the original valency of the heavy metal and neutralizing the solution.

8. The process which comprises oxidizing in an aqueous solution one mol of a complex water-soluble salt of a saturated aliphatic hydroxy carboxylic acid containing at least one hydroxy group in alpha-position to a carboxylic group, in which hydroxy group the hydrogen atom is replaced by a heavy metal capable of forming more than one stage of valency and being in a lower stage of valency, with somewhat more than half a mol of a peroxide of the group consisting of hydrogen- and light metal peroxides, for each valency to be added to the original valency of the heavy metal and neutralizing the solution.

9. The process which comprises oxidizing in an aqueous solution one mol of a complex water-soluble salt of a saturated aliphatic hydroxy carboxylic acid containing 3 to 6 carbon atoms and containing at least one hydroxy group in alpha-position to a carboxylic group, in which hydroxy group the hydrogen atom is replaced by a heavy metal capable of forming more than one stage of valency and being in a lower stage of valency, with at least half a mol of a peroxide of the group consisting of hydrogen and light metal peroxides for each valency to be added to the original valency of the heavy metal, and neutralizing the solution.

10. The process which comprises oxidizing in an aqueous solution one mol of a complex water-soluble salt of a saturated aliphatic hydroxy carboxylic acid containing 3 to 6 carbon atoms and containing at least one hydroxy group in alpha-position to a carboxylic group, in which hydroxy group the hydrogen atom is replaced by a heavy metal capable of forming more than one stage of valency and being in a lower stage of valency, with somewhat more than half a mol of peroxide of the group consisting of hydrogen and light metal peroxides for each valency to be added to the original valency of the heavy metal, and neutralizing the solution.

11. The process which comprises oxidizing in an aqueous solution one mol of a complex water-soluble salt of a saturated aliphatic hydroxy carboxylic acid containing 3 to 6 carbon atoms and containing at least one hydroxy group in alpha-position to a carboxylic group, in which hydroxy group the hydrogen atom is replaced by trivalent antimony with somewhat more than one mol of a peroxide of the group consisting of hydrogen and light metal peroxides, and neutralizing the solution.

12. In the process of preparing metal complex compounds the step which comprises oxidizing in aqueous solution one molecular proportion of a complex compound of a water-soluble gluconate with trivalent antimony, in which complex compound hydrogen atoms of alcoholic hydroxyl groups are replaced by antimony, with somewhat more than one molecular proportion of hydrogen peroxide.

13. In the process of preparing complex metal compounds, the step which comprises oxidizing in an aqueous solution one mol of a complex alkali metal salt of a saturated aliphatic hydroxy carboxylic acid containing at least one hydroxy group in alpha-position to a carboxylic group, in which hydroxy group the hydrogen atom is replaced by a heavy metal capable of forming more than one stage of valency and being in a lower stage of valency, with at least half a mol of a peroxide of the group consisting of hydrogen and light metal peroxides for each valency to be added to the original valency of the heavy metal.

14. In the process of preparing complex metal compounds, the step which comprises oxidizing in an aqueous solution one mol of a complex amine salt of a saturated aliphatic hydroxy carboxylic acid containing at least one hydroxy group in alpha-position to a carboxylic group, in which hydroxy group the hydrogen atom is replaced by a heavy metal capable of forming more than one stage of valency and being in a lower stage of valency, with at least half a mol of a peroxide of the group consisting of hydrogen and light metal peroxides for each valency to be added to the original valency of the heavy metal.

15. A neutral complex compound of an alkali metal salt of a saturated aliphatic hydroxy carboxylic acid containing at least one hydroxyl group standing in alpha-position to a carboxylic group, the hydrogen atom of said hydroxyl group being replaced by a heavy metal of an atomic number of 50 to 51 being present in its higher stage of valency, the said complex compounds being water-soluble substances.

16. A neutral complex compound of a water-soluble salt of a saturated aliphatic hydroxy carboxylic acid containing at least one hydroxyl group standing in alpha-position to a carboxylic group the hydrogen atom of said hydroxyl group being replace by a heavy metal of an atomic number of 50 to 51 which is present in its higher stage of valency, which complex compounds are water-soluble substances.

17. A neutral complex compound of a water-soluble salt of a saturated aliphatic hydroxy carboxylic acid containing 3 to 6 carbon atoms and at least one hydroxyl group standing in alpha-position to a carboxylic group the hydrogen atom of said hydroxyl group being replaced by a heavy metal of an atomic number of 50 to 51 which is present in its higher stage of valency, which complex compounds are water-soluble substances.

18. A neutral complex compound of an amine salt of a saturated aliphatic hydroxy carboxylic acid containing at least one hydroxyl group standing in alpha-position to a carboxylic group, the hydrogen atom of said hydroxyl group being replaced by a heavy metal of an atomic number of 50 to 51 and being present in its higher stage of valency, the said complex compounds being water-soluble substances.

19. Neutral complex compounds of a saturated aliphatic hydroxy carboxylic acid containing at least one hydroxyl group standing in alpha-position to a carboxyl group, and tetravalent-tin, the said complex compounds being whitish powders.

20. Neutral complex compounds of a saturated aliphatic hydroxy carboxylic acid containing 3 to 6 carbon atoms and at least one hydroxyl group standing in alpha-position to a carboxylic group and tetravalent-tin, the said complex compounds being whitish powders.

21. Neutral potassium tetravalent-tin tartrate, being a whitish powder, soluble in water on heating.

HANS SCHMIDT.